United States Patent
Geirhofer et al.

(10) Patent No.: US 10,420,112 B2
(45) Date of Patent: Sep. 17, 2019

(54) RESOURCE COORDINATION FOR PEER-TO-PEER GROUPS THROUGH DISTRIBUTED NEGOTIATION

(71) Applicant: QUALCOMM Incorporated, San Diego, CA (US)

(72) Inventors: Stefan Geirhofer, Brooklyn, NY (US); Naga Bhushan, San Diego, CA (US); Ravi Palanki, Cupertino, CA (US); Aleksandar Damnjanovic, Del Mar, CA (US); Parag Arun Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/435,029

(22) Filed: Feb. 16, 2017

(65) Prior Publication Data
US 2017/0164374 A1    Jun. 8, 2017

Related U.S. Application Data

(62) Division of application No. 13/103,733, filed on May 9, 2011, now Pat. No. 9,614,641.
(Continued)

(51) Int. Cl.
*H04W 72/04* (2009.01)
*H04L 29/08* (2006.01)
(Continued)

(52) U.S. Cl.
CPC .......... *H04W 72/0493* (2013.01); *H04L 1/00* (2013.01); *H04L 5/1438* (2013.01);
(Continued)

(58) Field of Classification Search
CPC .......... H04W 72/0493; H04W 76/14; H04W 8/005; H04W 76/023; H04W 28/18;
(Continued)

(56) References Cited

U.S. PATENT DOCUMENTS

| 7,152,100 B2 | 12/2006 | Thomas et al. |
| 7,308,496 B2 | 12/2007 | Yeager et al. |

(Continued)

FOREIGN PATENT DOCUMENTS

| CN | 1735224 A | 2/2006 |
| CN | 101227726 A | 7/2008 |

(Continued)

OTHER PUBLICATIONS

Bonta J et al., "Ad Hoc Relay Frame Structure" IEEE, Piscataway, NJ, USA, Jan. 16, 2008 (Jan. 16, 2008), pp. 1-11, XP040391541.
(Continued)

*Primary Examiner* — Walli Z Butt
(74) *Attorney, Agent, or Firm* — Arent Fox, LLP; Clint R. Morin

(57) ABSTRACT

Techniques for determining resources to use for peer-to-peer (P2P) communication are disclosed. In an aspect, a network entity may receive feedback information (e.g., resource usage information and/or channel state information) from P2P devices and may perform resource partitioning based on the feedback information to allocate some of the available resources for P2P communication. The allocated resources may observe little or no interference from devices engaged in wide area network (WAN) communication. In another aspect, P2P groups may perform resource negotiation via a WAN connection (e.g., with little or no involvement by the WAN) to assign the allocated resources to different P2P groups. In yet another aspect, a device may autonomously determine whether to communicate with another device
(Continued)

directly or via a WAN, e.g., whether to initiate P2P communication with another device and whether to terminate P2P communication. In yet another aspect, a network entity may participate in resource negotiation by P2P devices.

17 Claims, 10 Drawing Sheets

Related U.S. Application Data

(60) Provisional application No. 61/334,143, filed on May 12, 2010, provisional application No. 61/349,659, filed on May 28, 2010.

(51) Int. Cl.
| | | |
|---|---|---|
| *H04W 76/14* | (2018.01) | |
| *H04W 8/00* | (2009.01) | |
| *H04L 1/00* | (2006.01) | |
| *H04W 28/18* | (2009.01) | |
| *H04L 5/14* | (2006.01) | |
| *H04W 84/18* | (2009.01) | |
| *H04W 28/08* | (2009.01) | |
| *H04W 72/02* | (2009.01) | |
| *H04W 92/18* | (2009.01) | |

(52) U.S. Cl.
CPC .......... *H04L 67/104* (2013.01); *H04W 8/005* (2013.01); *H04W 28/18* (2013.01); *H04W 76/14* (2018.02); *H04L 1/0026* (2013.01); *H04W 28/08* (2013.01); *H04W 72/02* (2013.01); *H04W 84/18* (2013.01); *H04W 92/18* (2013.01)

(58) Field of Classification Search
CPC ..... H04W 72/02; H04W 28/08; H04W 92/18; H04W 84/18; H04L 5/1438; H04L 67/104; H04L 1/00; H04L 1/0026
See application file for complete search history.

(56) References Cited

U.S. PATENT DOCUMENTS

| | | | |
|---|---|---|---|
| 8,300,715 | B2 | 10/2012 | Li et al. |
| 9,614,641 | B2 | 4/2017 | Geirhofer et al. |
| 2003/0144003 | A1 | 7/2003 | Ranta et al. |
| 2005/0027871 | A1 | 2/2005 | Bradley et al. |
| 2006/0155814 | A1 | 7/2006 | Bennett et al. |
| 2007/0104138 | A1 | 5/2007 | Rudolf et al. |
| 2007/0211677 | A1 | 9/2007 | Laroia et al. |
| 2008/0069063 | A1 | 3/2008 | Li et al. |
| 2008/0313698 | A1 | 12/2008 | Zhao et al. |
| 2009/0005094 | A1 | 1/2009 | Lee et al. |
| 2009/0011770 | A1 | 1/2009 | Jung et al. |
| 2009/0023460 | A1 | 1/2009 | Cho et al. |
| 2009/0116430 | A1 | 5/2009 | Bonta et al. |
| 2009/0196174 | A1 | 8/2009 | Ji et al. |
| 2009/0310570 | A1 | 12/2009 | Smith |
| 2010/0049864 | A1 | 2/2010 | Lu et al. |
| 2010/0056061 | A1 | 3/2010 | Luo et al. |
| 2010/0093364 | A1* | 4/2010 | Ribeiro ............... H04W 72/082 455/452.2 |
| 2010/0202391 | A1 | 8/2010 | Palanki et al. |
| 2010/0205099 | A1 | 8/2010 | Ahmavaara et al. |
| 2011/0082939 | A1* | 4/2011 | Montemurro ......... H04W 76/14 709/227 |
| 2011/0161697 | A1* | 6/2011 | Qi .......................... G06F 1/3209 713/320 |
| 2011/0255431 | A1 | 10/2011 | Wang et al. |
| 2012/0290730 | A1 | 11/2012 | Desai et al. |
| 2012/0322368 | A1 | 12/2012 | Desai et al. |

FOREIGN PATENT DOCUMENTS

| | | |
|---|---|---|
| JP | 2008503141 A | 1/2008 |
| JP | 2008510344 A | 4/2008 |
| JP | 2009017559 A | 1/2009 |
| JP | 2009500888 A | 1/2009 |
| JP | 2009500969 A | 1/2009 |
| JP | 2009515477 A | 4/2009 |
| JP | 2009147485 A | 7/2009 |
| JP | 2010504693 A | 2/2010 |
| KR | 20080032078 A | 4/2008 |
| KR | 20080113837 A | 12/2008 |
| KR | 20140008268 A | 1/2014 |
| WO | 2005125248 A1 | 12/2005 |
| WO | 2006016331 A1 | 2/2006 |
| WO | 2007008857 A2 | 1/2007 |
| WO | 2007055993 A1 | 5/2007 |
| WO | 2008034038 A1 | 3/2008 |
| WO | 2009009572 A2 | 1/2009 |
| WO | 2009138820 A1 | 11/2009 |
| WO | 2010078273 A2 | 7/2010 |

OTHER PUBLICATIONS

International Search Report and Written Opinion—PCT/US2011/036343, ISA/EPO—dated Aug. 17, 2011.

* cited by examiner

RESOURCE COORDINATION FOR PEER-TO-PEER GROUPS THROUGH DISTRIBUTED NEGOTIATION

The present application is a divisional application of U.S. patent application Ser. No. 13/103,733, entitled "RESOURCE COORDINATION FOR PEER-TO-PEER GROUPS THROUGH DISTRIBUTED NEGOTIATION", filed on May 9, 2011 now allowed and claims priority to provisional U.S. Application Ser. No. 61/334,143, entitled "NETWORK-TRANSPARENT RESOURCE COORDINATION FOR PEER-TO-PEER LINKS THROUGH DISTRIBUTED NEGOTIATIONS," filed May 12, 2010, and provisional U.S. Application Ser. No. 61/349,659, entitled "IMPROVING DISTRIBUTED PEER-TO-PEER RESOURCE NEGOTIATION THROUGH OPTIONAL NETWORK ASSISTANCE," filed May 28, 2010, both incorporated herein by reference in their entirety.

BACKGROUND

I. Field

The present disclosure relates generally to communication, and more specifically to techniques for supporting peer-to-peer (P2P) communication.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. A wireless communication network may also be referred to as a wide area network (WAN).

A wireless communication network may include a number of base stations that can support communication for a number of devices. A device may communicate with a base station for WAN communication. A device may also be able to communicate peer-to-peer with one or more other devices for P2P communication. It may be desirable to efficiently support P2P communication between devices.

SUMMARY

Techniques for determining resources to use for P2P communication are described herein. In one design, a network entity (e.g., a base station) may perform resource partitioning to allocate some of the available resources for P2P communication. The allocated resources may observe little or no interference from devices engaged in WAN communication.

In an aspect, P2P groups may perform resource negotiation (e.g., with little or no involvement by the WAN) to assign the allocated resources to different P2P groups. Resource negotiation by the P2P groups may be facilitated via connectivity through the WAN. In one design, a first device may communicate with at least one other device via the WAN to negotiate at least one parameter related to P2P communication. The first device may communicate peer-to-peer with a second device in accordance with the negotiated at least one parameter. In one design, the at least one parameter may comprise a parameter related to resources assigned to the device. The first device may communicate peer-to-peer with the second device using the assigned resources.

In another aspect, a device may autonomously determine whether to communicate with another device directly or via a WAN. In one design, a first device may perform peer discovery and detect at least one other device. The first device may autonomously decide whether to initiate P2P communication with the at least one other device. The first device may also autonomously decide whether to terminate P2P communication with the at least one other device.

In yet another aspect, a network entity (e.g., a base station) may perform resource partitioning based on information received from devices. In one design, the network entity may receive resource usage information and/or channel state information sent by at least one device to the network entity. The network entity may determine an amount of resources to allocate for P2P communication based on the resource usage information and/or the channel state information. The network entity may transmit (e.g., broadcast) information indicative of the resources allocated for P2P communication.

In yet another aspect, a network entity (e.g., a base station) may participate in resource negotiation between devices in order to assist with the resource negotiation and/or to reclaim some of the allocated resources for WAN communication. In one design, the network entity may receive messages exchanged between a plurality of devices for resource negotiation. The network entity may participate in the resource negotiation between the plurality of devices. For example, the network entity may modify at least one message received from at least one originating device and may forward at least one modified message to at least one recipient device.

Various aspects and features of the disclosure are described in further detail below.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
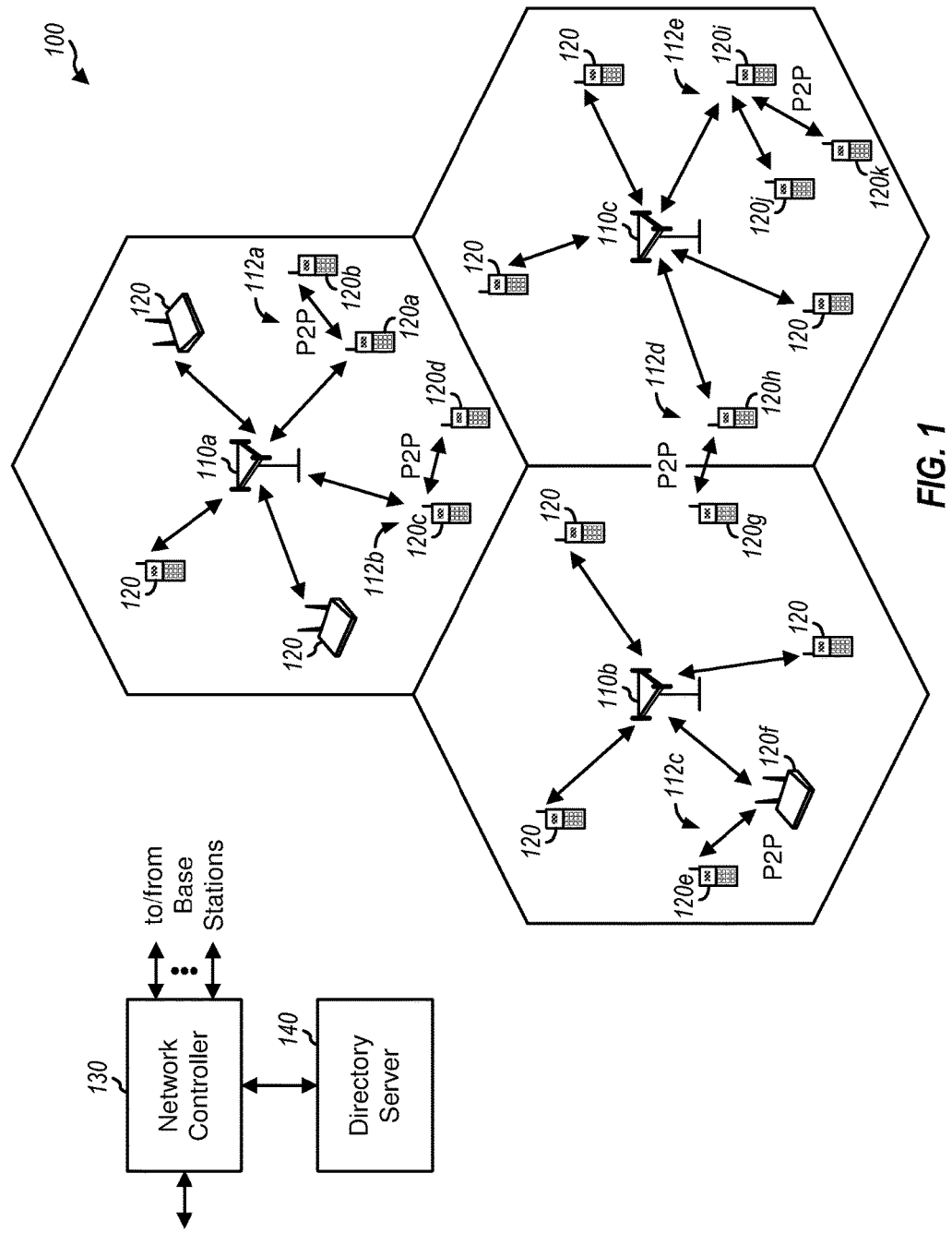
FIG. 1 shows a WAN supporting P2P communication.

FIG. 1 shows a WAN 100, which may be a LTE network or some other WAN. WAN 100 may include a number of base stations and other network entities. For simplicity, only three base stations 110a, 110b and 110c, one network controller 130, and one directory server 140 are shown in FIG. 1. A base station may be an entity that communicates with devices and may also be referred to as a Node B, an evolved Node B (eNB), an access point, etc. Each base station may provide communication coverage for a particular geographic area and may support communication for the devices located within the coverage area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

A base station may provide communication coverage for a macro cell, a pico cell, a femto cell, and/or other types of cell. A macro cell may cover a relatively large geographic area (e.g., several kilometers in radius) and may allow unrestricted access by devices with service subscription. A pico cell may cover a relatively small geographic area and may allow unrestricted access by devices with service subscription. A femto cell may cover a relatively small geographic area (e.g., a home) and may allow restricted access by devices having association with the femto cell (e.g., devices in a Closed Subscriber Group (CSG)). In the example shown in FIG. 1, WAN 100 includes macro base stations 110a, 110b and 110c for macro cells. WAN 100 may also include pico base stations for pico cells and/or home base stations for femto cells (not shown in FIG. 1).

Network controller 130 may couple to a set of base stations and may provide coordination and control for these base stations. Network controller 130 may communicate with the base stations via a backhaul. The base stations may also communicate with one another via the backhaul. Directory server 140 may support P2P communication, as described below. Directory server 140 may be part of WAN 100 or may be external to WAN 100. Directory server 140 may be a separate entity (as shown in FIG. 1) or may be part of a base station, a network controller, or some other entity. In any case, directory server 140 may be reachable by devices desiring to communicate peer-to-peer.

Devices 120 may be dispersed throughout WAN 100, and each device may be stationary or mobile. A device may also be referred to as a node, a user equipment (UE), a station, a mobile station, a terminal, an access terminal, a subscriber unit, etc. A device may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A device may be able to communicate with base stations, other devices, etc.

In the description herein, WAN communication refers to communication between a device and a base station, e.g., for a call with a remote entity such as another device. A WAN device is a device that is interested or engaged in WAN communication. P2P communication refers to direct communication between two or more devices, without going through a base station. A P2P device is a device that is interested or engaged in P2P communication. A P2P group refers to a group of two or more devices interested or engaged in P2P communication. A P2P link refers to a communication link for a P2P group. In one design, one device in a P2P group may be designated as a P2P group owner (or a P2P server), and each remaining device in the P2P group may be designated as a P2P client. The P2P group owner may perform certain management functions such as exchanging signaling with a WAN, coordinating data transmission between the P2P group owner and the P2P client(s), etc.

In the example shown in FIG. 1, a P2P group 112a includes devices 120a and 120b under the coverage of base station 110a. A P2P group 112b includes devices 120c and 120d also under the coverage of base station 110a. A P2P group 112c includes devices 120e and 120f under the coverage of base station 110b. A P2P group 112d includes devices 120g and 120h under the coverage of different base stations 110b and 110c. A P2P group 112e includes devices 120i, 120j and 120k under the coverage of base station 110c. Devices 120a, 120c, 120e, 120g and 120i may be P2P group owners for P2P groups 112a, 112b, 112c, 112d and 112e, respectively. Devices 120b, 120d, 120f, 120h, 120j and 120k may be P2P clients in their P2P groups. The other devices 120 in FIG. 1 may be engaged in WAN communication.

In one design, P2P communication may take place only within each P2P group and only between a P2P group owner and its P2P client(s). For example, two P2P clients within the same P2P group may exchange information by having one P2P client send the information to the P2P group owner and having the P2P group owner forward the information to the other P2P client. A given device may belong in multiple P2P group but may behave as either a P2P group owner or a P2P client in each P2P group.

In general, communication may be facilitated via transmissions on the downlink and uplink. For WAN communication, the downlink (or forward link) refers to the communication link from base stations to devices, and the uplink (or reverse link) refers to the communication link from devices to base stations. For P2P communication, P2P downlink refers to the communication link from P2P group owners to P2P clients, and P2P uplink refers to the communication link from P2P clients to P2P group owners.

P2P communication may offer certain advantages over WAN communication, especially for devices located close to each other. In particular, efficiency may improve because the pathloss between two devices may be substantially smaller than the pathloss between either device to its serving base station. Furthermore, the two devices may communicate directly via a single transmission "hop" for P2P communication instead of via two transmission hops for WAN communication—one hop for the uplink from one device to its serving base station and another hop for the downlink from the same or different base station to the other device. P2P communication may thus be used to improve user capacity and also to improve network capacity by shifting some load over to P2P communication.

In general, P2P communication may be supported on the same spectrum used by WAN 100 in a co-channel P2P deployment or on a different spectrum not used by WAN 100. The term "spectrum" may generically refer to a range of frequencies, which may correspond to a frequency channel, a subband, a carrier, etc. For example, P2P communication may be supported in unlicensed spectrum or white space spectrum, subject to any constraints governing the usage of such spectrum. Co-channel P2P deployment may be used, for example, when a separate spectrum is not available to support P2P communication. Accommodating P2P communication and WAN communication on the same spectrum may result in interference between WAN devices and P2P devices.

Resource partitioning may be performed to semi-statically allocate some of the available time-frequency resources in WAN 100 for P2P communication. Interference between WAN devices and P2P devices may be mitigated by having the P2P devices communicate on the allocated resources and the WAN devices communicate on the remaining resources. Resource partitioning for P2P communication may be performed in various manners.

WAN 100 may utilize FDD and may have one spectrum for the downlink and another spectrum for the uplink. In this case, for a co-channel P2P deployment, some time-frequency resources on the uplink spectrum may be allocated for P2P communication. Alternatively, WAN 100 may utilize TDD and may have the same spectrum for both the downlink and uplink. Some subframes may be allocated for the downlink, and the remaining subframes may be allocated for the uplink. In this case, for a co-channel P2P deployment, some time-frequency resources in the uplink subframes may be allocated for P2P communication.

Figures 2A, 2B, 2C:
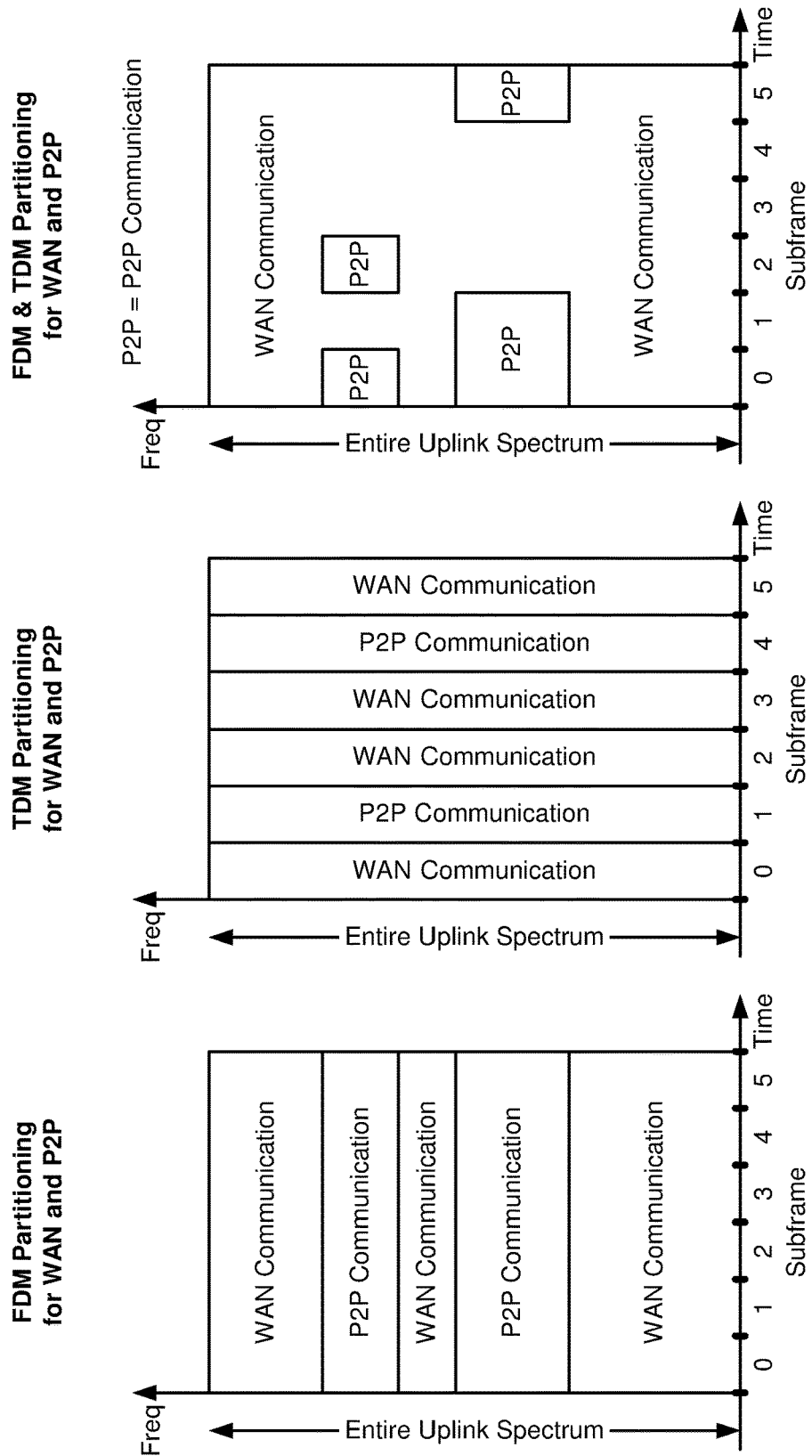
FIGS. 2A, 2B and 2C show three exemplary resource partitioning schemes.

FIG. 2A shows a design of resource partitioning to support P2P communication on the uplink spectrum with frequency division multiplexing (FDM). In this design, a portion of the uplink spectrum may be semi-statically allocated for P2P communication and may be contiguous (not shown in FIG. 2A) or non-contiguous (as shown in FIG. 2A). The remaining portion of the uplink spectrum may be used for WAN communication.

FIG. 2B shows a design of resource partitioning to support P2P communication on the uplink spectrum with time division multiplexing (TDM). In this design, some subframes for the uplink spectrum may be allocated for P2P communication. The remaining subframes for the uplink spectrum may be used for WAN communication.

FIG. 2C shows a design of resource partitioning to support P2P communication on the uplink spectrum with both FDM and TDM. In this design, a portion of the uplink spectrum in some subframes may be allocated for P2P communication. The remaining time-frequency resources on the uplink spectrum may be used for WAN communication.

In one design, each of the resources allocated for P2P communication may be used for either P2P downlink or P2P uplink. This design may provide more flexibility. In another design, some of the allocated resources may be used for the P2P downlink, and the remaining allocated resources may be used for the P2P uplink. The resources used for the P2P downlink may be referred to as P2P downlink resources, and the resources used for the P2P uplink may be referred to as P2P uplink resources. In one design, TDD may be used for P2P communication, and the P2P downlink and P2P uplink may be allocated different subframes. For example, eight time interlaces 0 to 8 may be defined, with each time interlace including every eight subframe. Time interlaces 0 and 4 may be allocated for P2P communication, and the remaining time interlaces may be used for WAN communication. Time interlace 0 may be used for the P2P downlink, and time interlace 4 may be used for the P2P uplink. Dividing the allocated resources into P2P downlink resources and P2P uplink resources may be desirable to obviate the need to address interference between P2P clients in different P2P groups.

Resource partitioning may mitigate interference between WAN communication and P2P communication. P2P devices may communicate peer-to-peer using the resources allocated for P2P communication and may avoid causing interference to WAN devices communicating on the remaining resources. However, different P2P groups may communicate using the same resources and may interfere one another.

In an aspect, P2P groups may perform resource negotiation to assign resources to each P2P group from among the resources allocated for P2P communication. Resource negotiation may also be referred to as resource coordination, etc. Resource negotiation may be performed between P2P groups, without involvement by the WAN except to provide WAN connectivity, and may thus be considered as a network-transparent architecture. Resource negotiation between P2P groups may be used for (i) co-channel P2P deployment on the same spectrum as WAN communication and (ii) P2P deployment on a separate spectrum not used for WAN communication. Resource negotiation may mitigate interference and avoid jamming between nearby P2P groups.

In another aspect, resource negotiation between P2P groups may be facilitated via WAN connectivity. Devices in different P2P groups may discover each other via peer discovery. These devices may be unable to directly communicate with each other for resource negotiation, e.g., because resources have not yet been assigned for direct communication between these devices. These devices may establish a connection with the WAN and may communicate with each other via the WAN for resource negotiation.

The WAN may provide connectivity for a group of P2P devices engaged in P2P communication. WAN connectivity for the group of P2P devices may be concurrent with P2P communication between the P2P devices in the group. WAN connectivity may be considered as concurrent and may be perceived as such by both a user and upper layers of a protocol stack. However, this concurrency does not require the P2P devices to be able to simultaneously transmit or receive (e.g., in the same subframe) for both WAN communication and P2P communication.

Figure 3:
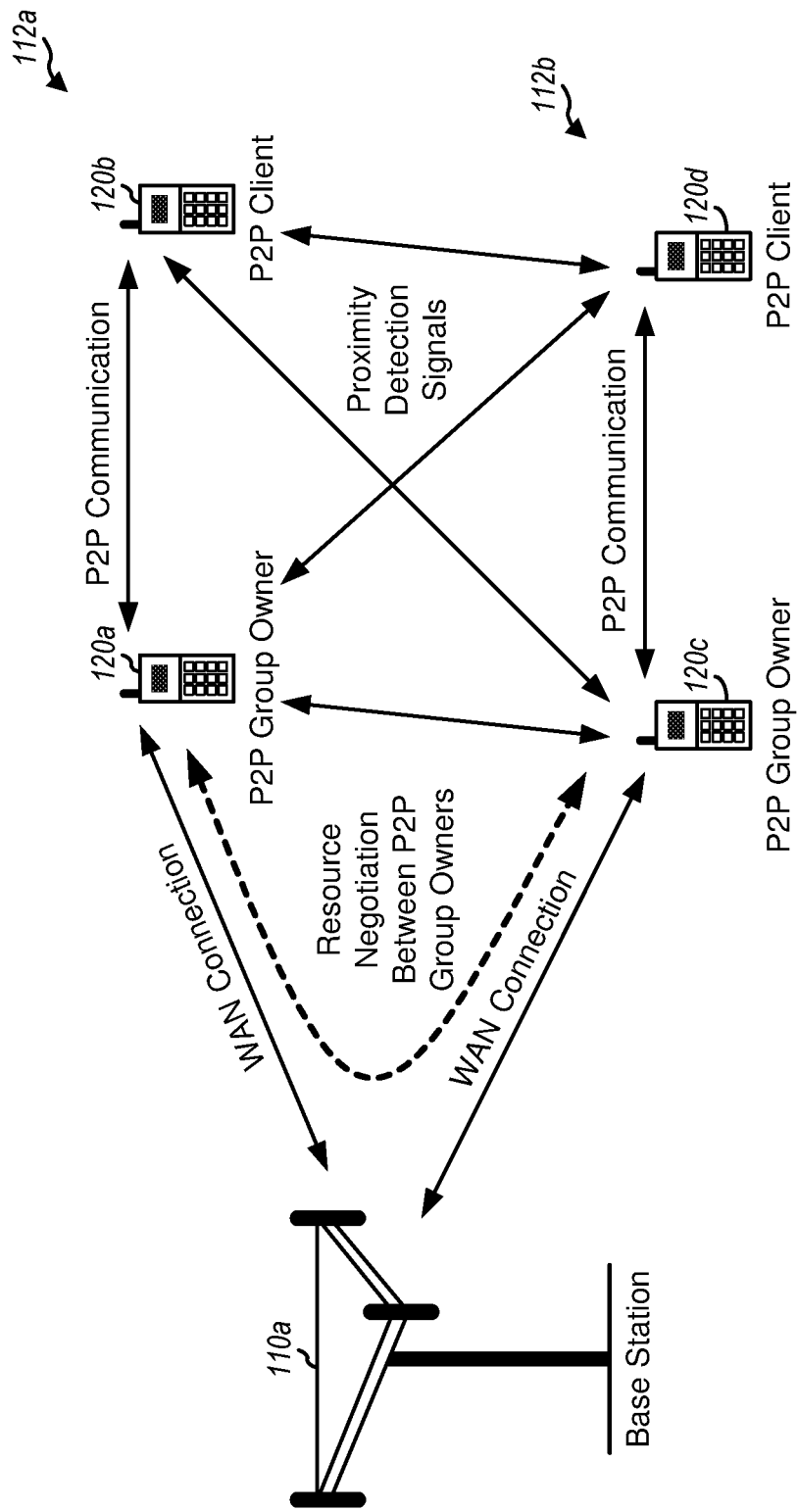
FIG. 3 shows communication between different P2P groups via the WAN.

FIG. 3 shows an example of communication between different P2P groups 112a and 112b via WAN 100. Devices 120a and 120b in P2P group 112a may be interested or engaged in P2P communication. Device 120a may be a P2P group owner for P2P group 112a and may have a WAN connection to base station 110a. Similarly, devices 120c and 120d in P2P group 112b may be interested or engaged in P2P communication. Device 120c may be a P2P group owner for P2P group 112b and may have a WAN connection to base station 110a.

Device 120a and/or 120b in P2P group 112a may detect device 120c and/or 120d in P2P group 112b via peer discovery. Correspondingly, device 120c and/or device 120d in P2P group 112b may detect device 120a and/or 120b in P2P group 112a via peer discovery. Device 120a in P2P group 112a may communicate with device 120c in P2P group 112b via their WAN connections for resource negotiation.

Figure 4:
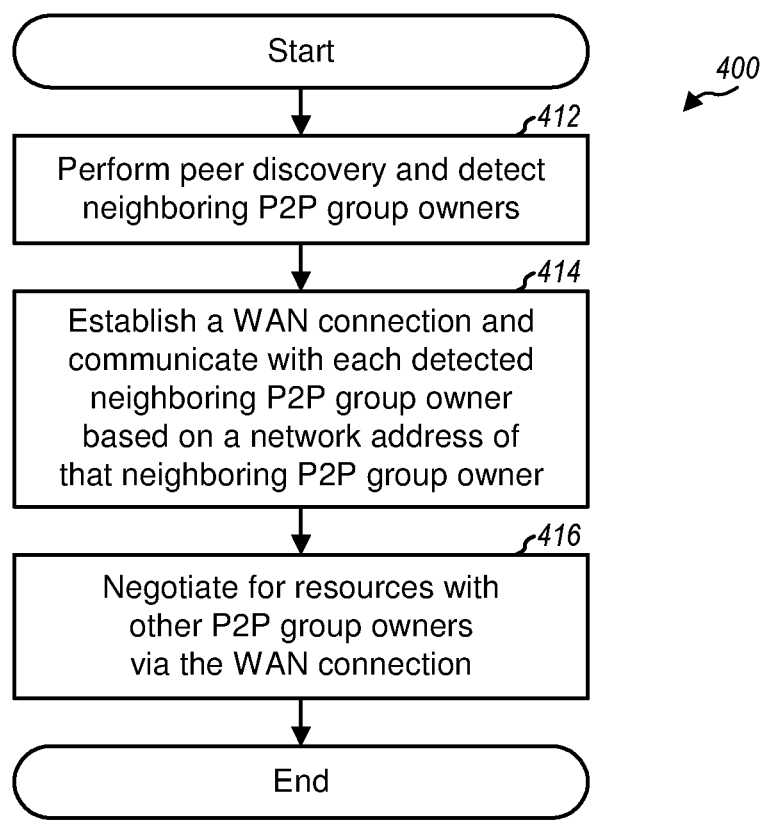
FIG. 4 shows a process for performing resource negotiation by a P2P device.

FIG. 4 shows a design of a process 400 for performing resource negotiation by a P2P device. The P2P device may perform peer discovery and may detect the presence of neighboring P2P group owners (block 412). For peer discovery, the P2P device may (i) transmit a proximity detection signal (PDS) to indicate the presence of the device and/or (ii) listen for proximity detection signals from other devices. The P2P device may obtain a device identifier (ID) of each detected neighboring P2P group owner based on a proximity detection signal received from that P2P group owner. A device ID of a device may also be referred to as a P2P ID. In one design, a device ID may be relatively short (e.g., due to a small payload of the proximity detection signal) and may not uniquely identify a device. In this design, the P2P device may translate the device ID of each detected neighboring P2P group owner to a network address, which may be unique for the neighboring P2P group owner. For example, discovery server 140 may maintain device IDs and network addresses of P2P devices within a certain area. The P2P device may query discovery server 140 with the device ID of each detected neighboring P2P group owner and may receive a corresponding network address of that P2P group owner. The network address may be an Internet Protocol version 4 (IPv4) address, an IP version 6 (IPv6) address, or some other address. In another design, a device ID may comprise a network address that can uniquely identify a device.

The P2P device may know the presence of the neighboring P2P group owners but may be unable to communicate directly with these P2P group owners. Hence, WAN connectivity may be leveraged to facilitate communicate between P2P devices for resource negotiation. The P2P device may establish a WAN connection and may then be able to communicate with each detected neighboring P2P group owner based on the network address of that neighboring P2P group owner (block 414).

The P2P device may be a P2P group owner of a P2P group and may negotiate for resources with other P2P group owners via the WAN connection (block 416). The P2P group owners may exchange information and engage in negotiation amongst themselves for resources, e.g., as described below. The P2P device may be assigned some resources (e.g., a set of time interlaces) via the resource negotiation. The P2P device may then communicate with one or more other P2P devices in its P2P group using its assigned resources. The neighboring P2P group owners may avoid causing excessive interference to the resources assigned to the P2P device. Coordinating assignment of resources to different P2P groups may mitigate interference between the P2P groups, which may improve performance.

FIG. 4 shows a network-transparent negotiation process in which WAN connectivity of P2P devices may be leveraged by the P2P groups to exchange information for resource negotiation via the WAN. Resource negotiation between the P2P devices may be transparent to the WAN, which may result in certain advantages. For example, network-transparent negotiation may reduce standardization efforts and may alleviate implementation efforts on the network side.

Figure 5:
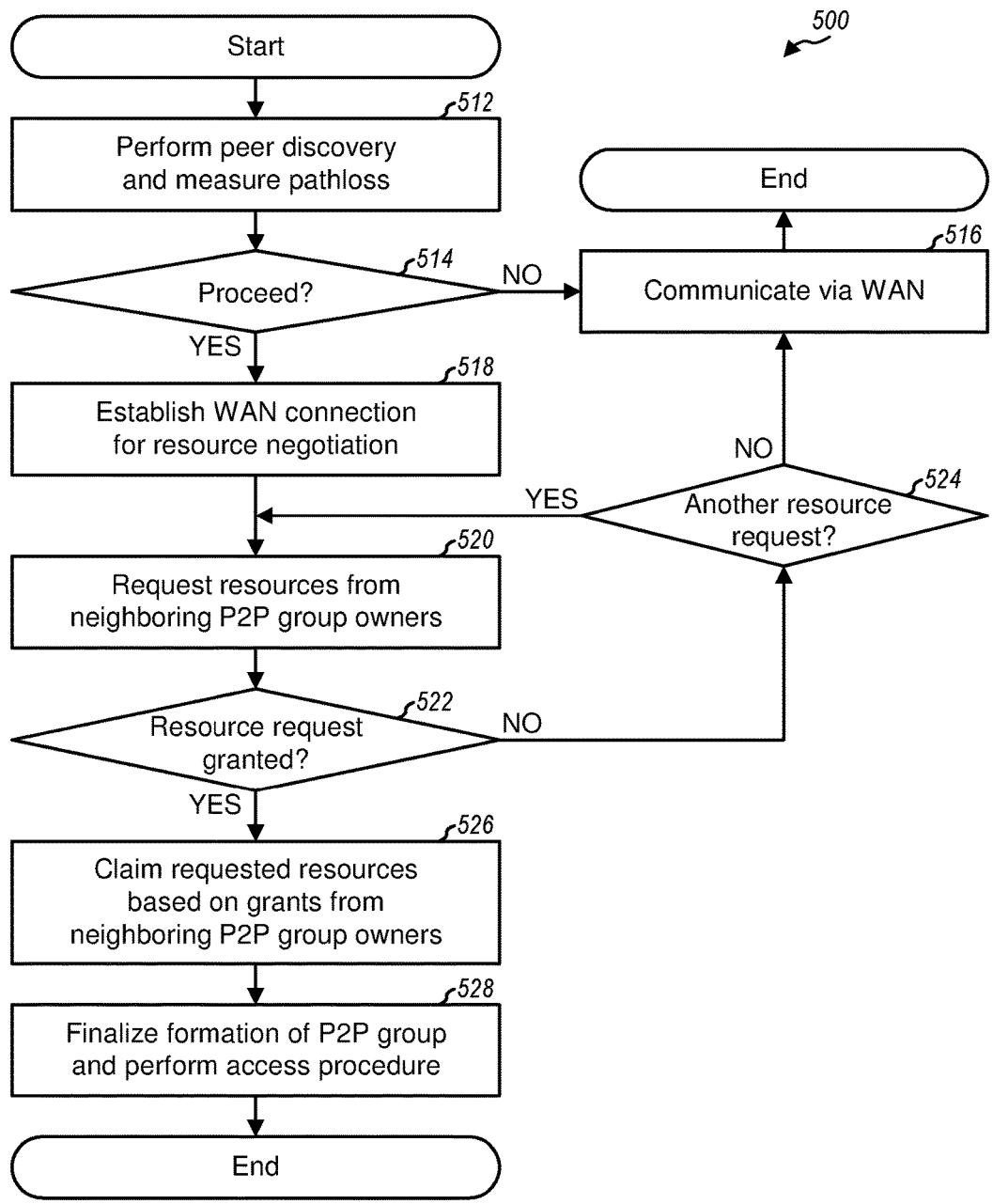
FIG. 5 shows a process for forming a new P2P group.

FIG. 5 shows a design of a process 500 for forming a new P2P group. Process 500 may be triggered by a discovery mechanism, which may be part of a P2P application. For simplicity, the description below assumes that two P2P devices (which are referred to as device A and device B) desire to communicate peer-to-peer. Process 500 may be performed by one of the two devices (e.g., by device A in the description below) or by each of the two devices. P2P group formation for more than two P2P devices may be performed in a similar manner.

Device A may perform peer discovery and may detect the presence of device B (block 512). In one design, one device (e.g., device B) may be designated to transmit a proximity detection signal, and the other device (e.g., device A) may listen for proximity detection signals from other devices. In another design, each device may transmit its proximity detection signal and also listen for proximity detection signals from other devices. Device A may estimate the pathloss for device B based on the proximity detection signal received from device B (also block 512).

In one design, which is assumed for much of the description below, device A may tentatively assume the role of a P2P group owner of a new P2P group to be established with device B. In another design, each device may tentatively assume the role of a P2P group owner of the new P2P group, and one device may thereafter be selected as an actual P2P group owner. For both designs, device A may obtain a device ID of device B and may translate the device ID to a network address, e.g., by querying discovery server 140. Device A may establish a WAN connection and may be able to communicate with device B based on the network address of device B.

In general, peer discovery may be performed in various manners. In one design, P2P group owners may transmit proximity detection signals, and P2P clients may listen for proximity detection signals. In this design, device A may transmit a proximity detection signal, and device B may detect the proximity detection signal from device A. Device B may also detect proximity detection signals from neighboring P2P group owners, determine device IDs and pathloss of these P2P group owners, measure interference from these P2P group owners, and report the gathered information to device A. Similarly, P2P clients in other P2P groups may detect the proximity detection signal from device A, determine the device ID and pathloss of device A, measure interference from device A, and report the gathered information to their P2P group owners. The neighboring P2P group owners may be able to establish a connection with device A based on the device ID of device A. In another design, P2P clients may transmit proximity detection signals, and P2P group owners may listen for proximity detection signals. In this design, device A may listen for proximity detection signals from device B and other devices in other P2P groups. Device A may identify neighboring P2P group owners, obtain their device IDs, determine their pathloss, and measure their interference at device A. In yet another design, P2P group owners and P2P clients may transmit proximity detection signals and may also listen for proximity detection signals.

Device A may make a preliminary assessment of whether P2P communication can provide adequate performance based on pathloss estimates, interference measurements, and/or other information (block 514). For example, if the pathloss between devices A and B is too large, or if other P2P groups in the vicinity causes high interference, then it may be better to select WAN communication instead of P2P communication (block 516). High interference may be quantified by interference exceeding a predetermined threshold or based on some other criterion. The preliminary assessment may be based on an initial estimate of throughput or rate achievable for the new P2P group. This initial throughput estimate may be based on an assumption of certain resources being assigned to the new P2P group and may be preliminary since resources have not yet been assigned to device A.

Device A may determine that it desires to communicate peer-to-peer with device B and to form the new P2P group. This determination may be based on a preliminary assessment that P2P communication can provide adequate performance. This determination may also be based on information received in the proximity detection signal from device B, which may indicate one or more services offered by device B, one or more services requested by device B, etc.

Device A may identify neighboring P2P group owners with which resource coordination should be performed. These neighboring P2P group owners may be identified based on the pathloss estimates and/or interference measurements, which may indicate that these neighboring P2P group owners may potentially cause excessive interference to the new P2P group. Correspondingly, the proximity detection signals from device A and/or device B may be detected by other devices in other P2P groups. The P2P group owners in these other P2P groups may identify device A as a P2P group owner with which resource negotiation should be performed.

Device A may establish a WAN connection for resource negotiation and may communicate with the neighboring P2P group owners via the WAN connection (block 518). The WAN connection may have also been established earlier by device A to communicate with device B. Device A may translate the device IDs of the neighboring P2P group owners to network addresses, e.g., by querying discovery server 140. Device A may use the network addresses to communicate with the neighboring P2P group owners via the WAN connection. The neighboring P2P group owners may also initiate communication with device A via the WAN for resource negotiation, e.g., based on reports by P2P clients in the other P2P groups to their respective P2P group owners. Resource negotiation may be restricted to a set of P2P devices that may experience high interference in order to limit complexity.

There may be an insufficient amount of "clean" resources that can provide satisfactory performance for direct communication between devices A and B. Hence, device A may use its WAN connectivity to neighboring P2P group owners to request resources for P2P communication with device B (block 520). In one design, device A may monitor resource usage and interference levels of different resources. Device A may send a resource request message to request certain resources on which device A can achieve good performance while having as little impact on other P2P devices as possible. The resource request message may include various types of information such as the specific resources and/or the amount of resources being requested by device A, specific target interference/transmit power levels for device A, a utility metric that may capture fairness metrics between P2P groups, etc.

The neighboring P2P group owners may receive the resource request message from device A and may determine whether to change their resource utilization as a result of the resource request from device A. In one design, each neighboring P2P group owner may have an option to either grant or reject the resource request from device A, e.g., depending on the current performance of that P2P group owner. In one design, a decision to grant or reject the resource request may involve network utility (e.g., across a certain neighborhood of involved P2P groups) in order to balance the resource request from device A with fairness considerations.

Device A may receive responses from the neighboring P2P group owners and may determine whether or not the requested resources can be used (block 522). For example, device A may claim and use the requested resources if all neighboring P2P group owners grant the resource request from device A (526). Device A may also be able to use the requested resources based on other criteria, possibly even if grants have not been received from all neighboring P2P group owners. If device A is unable to use the requested resources for any reason, then device A may treat the resource request as being rejected and may refrain from using the requested resources. Device A may communicate its intended action with respect to the requested resources to the neighboring P2P group owners to ensure that all P2P devices have consistent knowledge. Device A may determine whether to send another resource request message to request some other resources (block 524). If the answer is 'Yes', then device A may proceed to block 520 to send another resource request message. Otherwise, if the answer is 'No', then device A may communicate with device B via the WAN (block 516).

Device A may form the new P2P group with device B if a sufficient amount of resources has been granted to device A (block 528). Device A may serve as the P2P group owner of the new P2P group and may inform device B regarding which resources are available for an initial access procedure. Device B may use the same random access procedures used by the WAN to establish a connection to device A.

FIG. 5 shows an exemplary design of P2P group formation for two P2P devices. The design shown in FIG. 5 may be augmented in various manners to improve performance in certain scenarios. The choice of electing device A as a tentative P2P group owner may be arbitrary, assuming that devices A and B are comparable devices with similar communications and computation capabilities. Depending on the nature of the interference environment of the devices, electing device B as a tentative P2P group owner, as opposed to device A, may have a significant impact on performance Hence, in one design, blocks 512 through 526 may be performed separately under one hypothesis that device A is elected as the P2P group owner and also under another hypothesis that device B is elected as the P2P group owner. The hypothesis resulting in better performance may be selected.

FIG. 5 shows resource negotiation for P2P group formation. Resource negotiation may also be performed when a new P2P device desires to join an existing P2P group.

In one design, the process shown in FIG. 5 may also be used to add a new P2P client to the P2P group. Some steps in FIG. 5 may be simplified due to the existence of an established P2P group owner. The new P2P client may detect the proximity detection signal from the established P2P group owner. The new P2P client may estimate the pathloss and obtain the device ID of the established P2P group owner based on the proximity detection signal. In one design, the new P2P client does not listen for proximity detection signals from neighboring P2P group owners. In another design, for resource negotiation purposes, the new P2P client may listen for proximity detection signals from neighboring P2P group owners and may obtain a device ID and estimate the pathloss and interference of each detected P2P group owner. In one design, the new P2P client may establish a connection with the WAN, translate the device ID of the established P2P group owner to a network address (e.g., by querying discovery server 140), and communicate with the established P2P group owner via the WAN connection. The new P2P client may inform the established P2P group owner of dominant interfering P2P devices detected by the new P2P client. The established P2P group owner may perform resource negotiation with the neighboring P2P group owners by taking into account the information received from the new P2P client. The new P2P client may then establish a direct connection with the established P2P group owner for P2P communication.

In another design, the new P2P client may access the P2P group by performing an access procedure with the established P2P group owner. If the access procedure is successful, then the new P2P client may exchange information with the established P2P group owner via a direct connection (instead of via the WAN). If the access procedure fails, then the new P2P client may again attempt the access procedure (e.g., on different resources) or may abort the access procedure.

For both designs described above, if a direct connection between the established P2P group owner and the new P2P client is established, then the established P2P group owner may consider accommodating the new P2P client on resources already assigned to the P2P group owner. If accommodating the new P2P client on the assigned resources is expected to yield unsatisfactory performance, then the established P2P group owner may negotiate with neighboring P2P group owners for a larger amount of resources and/or different resources. Dependent on the resource negotiation algorithm employed, the established P2P group owner may update its transmit power levels or interference targets with the neighboring P2P group owners to ensure that excessive interference can be alleviated.

Resource negotiation may be performed when a new P2P group is established, e.g., as shown in FIG. 5. Resource negotiation may also be performed when a new P2P client is added to a P2P group. In one design, resource negotiation may be performed periodically or when triggered during a P2P communication session in order to account for changes in channel conditions or RF environment, changes in data requirements of P2P devices, etc. Each instance of resource negotiation may be performed, e.g., as shown by blocks 520 to 526 in FIG. 5.

Resources may be assigned to P2P groups in various manners. In one design, resources may be assigned to different P2P groups, and each P2P group may use its assigned resources and not use other resources. This design can provide a "hard" assignment of resources to P2P groups. In another design, resources may be assigned to different P2P groups in a more granular manner, e.g., by adjusting transmit power levels or target load levels in a limited number of discrete steps (e.g., three discrete steps). A target load level may be given by an interference-over-thermal (IoT) for OFDM and SC-FDMA, a rise-over-thermal (RoT) for CDMA, etc. This design can provide a more granular assignment of resources.

Figure 6:
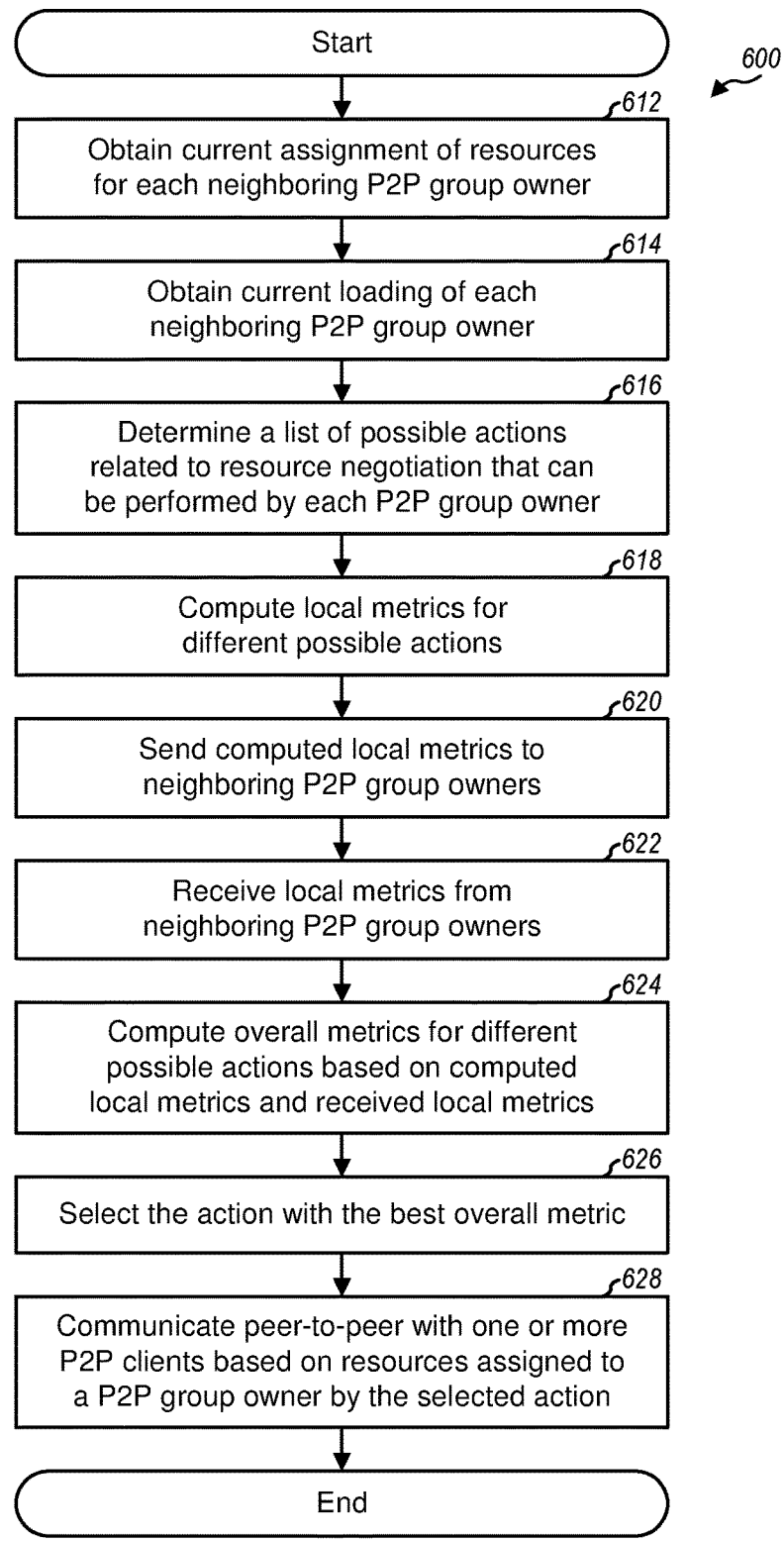
FIG. 6 shows a process for performing distributed resource negotiation.

FIG. 6 shows a design of a process 600 for performing resource negotiation. For clarity, process 600 is described below for one P2P group owner in a set of P2P group owners performing resource negotiation. This P2P group owner is referred to as P2P group owner p in the description below.

P2P group owner p may obtain the current assignment of resources (and possibly the transmit power levels or target load levels) for each neighboring P2P group owner (block 612). P2P group owner p may also obtain the current loading of each neighboring P2P group owner, which may be defined by the number of P2P clients currently served by the neighboring P2P group owner, the percentage of resources being used by the neighboring P2P group owner, etc. (block 614). P2P group owner p may also provide its current assigned resources (if any) and/or its loading to the neighboring P2P group owners.

P2P group owner p may determine a list of possible actions related to resource negotiation that can be performed by P2P group owner p and/or the neighboring P2P group owners (block 616). A possible action for resource negotiation may cover a specific assignment of resources for each P2P group owner and possibly the transmit power levels or target load levels for that P2P group owner on the resources. P2P group owner p may compute local metrics for different possible actions in the list (block 618). The local metrics may be based on a sum rate utility function or some other function. The local metrics for different possible actions may be used by different P2P group owners to compute overall metrics for different possible actions. P2P group owner p may send its computed local metrics to the neighboring P2P group owners (block 620) and may receive local metrics from each neighboring P2P group owner (block 622).

P2P group owner p may compute overall metrics for different possible actions based on its computed local metrics and the received local metrics (block 624). P2P group owner p may select the action with the best overall metric (block 626). Each neighboring P2P group owner may similarly compute overall metrics for different possible actions and may also select the action with the best overall metric. All P2P group owners should select the same action if they operate on the same set of local metrics. Each P2P group owner may then operate based on the selected action, without having to communicate with other P2P group owners regarding the selected action. Alternatively, the P2P group owners may negotiate to determine which action to take. This may entail exchanging overall metrics for some promising actions between the P2P group owners and selecting the action that can provide good performance for as many P2P group owners as possible. In any case, the selected action may be associated with a specific assignment of resources for P2P group owner p. P2P group owner p may communicate peer-to-peer with one or more P2P clients based on the resources assigned to P2P group owner p by the selected action (block 628).

FIG. 6 shows an exemplary design of performing resource negotiation by passing local metrics. P2P group owners may also perform resource negotiation in other manners.

In one design, P2P group owners may exchange negotiation messages for resource requests and responses. The negotiation messages may include various fields to facilitate resource negotiation between P2P group owners. In one design, a negotiation message may include one or more of the following fields:

Priority—indicate the priority of a resource request,
Requested resources—indicate resources being requested,
Target interference or transmit power level—indicate target interference level or transmit power level of a requesting P2P group owner, and
Utility metric—indicate throughput or some other utility.

The priority field may indicate the priority of a given resource request and may be set to one of a set of possible values. For example, the supported values may include low priority, medium priority, high priority, etc. The requested resources field may indicate the amount of resources and/or the specific resources being requested. The utility metric field may indicate the throughput or utility (i) currently experienced by a P2P group owner or (ii) achievable by the P2P group owner if the requested resources were granted. The utility metric may be used by neighboring P2P group owners to appropriately normalize their own utility metrics to ensure fairness across different P2P groups performing resource negotiation. The target interference or transmit power level may indicate a target interference level or a target transmit power level of a requesting P2P group owner. This information may be used by other P2P devices to determine their transmit power levels. A negotiation message may also include different and/or additional fields.

Association may be performed to determine whether a group of devices should communicate directly or via the WAN, i.e., select P2P communication or WAN communication for the group of devices. Association may be determined based on various factors such as expected achievable rates for P2P communication and WAN communication, expected interference impact due to P2P communication and WAN communication, fairness considerations, etc. Decisions from resource negotiation would likely have an impact on these factors. Hence, resource negotiation and association may be determined jointly to obtain good performance.

It may be difficult to estimate an expected achievable rate for WAN communication at the time of association. This is because the expected achievable rate may be dependent on various factors that are unknown at the time of association, such as the loading and scheduling behavior of the WAN. In one design, one or more thresholds may be defined and used for making association decisions. For example, an average rate achieved for WAN communication prior to forming a P2P group may be used as a reference point and may be compared against an expected achievable rate for P2P communication to make a decision on association.

In one design, resource negotiation between P2P groups may consider a throughput gain that may be achievable if a given P2P group switches from P2P communication to WAN communication. If the throughput gain is significant, then the P2P group may switch from P2P communication to WAN communication in order to improve the performance of one or more other P2P groups.

Resource negotiation may be performed between P2P groups to assign resources to these P2P groups. These resources may have been allocated for P2P communication via resource partitioning. The amount of resources to allocate for P2P communication should be such that good performance can be achieved for both P2P communication and WAN communication.

In another aspect, resource partitioning may be performed based on information received from P2P devices. In one design, all or some P2P devices (e.g., P2P group owners) may send pertinent information for resource partitioning to their serving base stations. The information from a given P2P device may indicate whether or not P2P communication is ongoing, ongoing activities of the P2P device, channel conditions observed by the P2P device, etc. A base station may receive information from P2P devices within its coverage and may allocate resources for P2P communication based on the information. For example, the base station may allocate a sufficient amount of resources for P2P communication based on the ongoing P2P activities of all P2P devices within its coverage. Allocating resources for P2P communication based on ongoing P2P activities may (i) ensure that the amount of allocated resources roughly matches the amount of P2P communication that exists among P2P devices and (ii) avoid a scenario in which the allocated resources are not used or are sparely used by the P2P devices. This design may allow the base station to remain in charge of what resources to allocate for P2P communication.

In one design, P2P devices may occasionally send request messages to inform their serving base stations that P2P communication is ongoing. The request messages may be sent periodically (e.g., at a relatively infrequent rate) and/or when triggered (e.g., due to a change in operating conditions). For example, a P2P group owner may periodically send an update message to its serving base station to indicate ongoing P2P activities. The serving base station may then allocate a sufficient amount of resources based on update messages received from all P2P group owners. The allocated resources for P2P communication may be signaled (e.g., broadcast) to the P2P group owners. A set of base stations may coordinate to determine the amount of resources and/or specific resources to allocate for P2P communication.

The network-transparent architecture described above may support P2P communication with little or no involvement by the WAN. The WAN may semi-statically allocate some resources for P2P communication, and P2P group owners may negotiate amongst themselves to assign the allocated resources, without intervention from the WAN. The WAN may periodically update the resource allocation to ensure that an adequate amount of resources is allocated for P2P communication. This updating may be achieved with limited involvement by the WAN.

In yet another aspect, a network entity (e.g., a base station) may interact with P2P devices for (i) resource negotiation between WAN and P2P in order to improve sharing of resources between WAN communication and P2P communication and/or (ii) resource negotiation between P2P groups in order to improve assignment of resources to different P2P groups. This network involvement may be referred to as a network-assisted architecture. The network-assisted architecture may be different from a network-controlled architecture in which resource partitioning and resource coordination may be performed by a network entity and simply communicated to P2P devices. In the network-assisted architecture, involvement by a network entity for resource partitioning and resource negotiation may be kept transparent to the P2P devices. This network-assisted architecture may support different levels of network involvement. For example, a "lazy" network implementation may have little or no network involvement whereas a "smart" network implementation may have more network involvement to improve performance of resource negotiation.

Resource partitioning may be performed in a co-channel P2P deployment to allocate some resources for P2P communication, as described above. Resource partitioning may be performed relatively infrequently, and resources may be semi-statically allocated for P2P communication for a relatively long time. This may be especially the case if resource partitioning is performed by/for a set of base stations, which can better accommodate P2P devices located at coverage edge and potentially causing interference to and/or observing interference from the WAN. Furthermore, resources may be allocated for P2P communication in coarse granularity, which may be dependent on the minimum amount and/or the minimum unit of resources that can be allocated to P2P communication. For example, a minimum of two time interlaces may be allocated for P2P communication (e.g., one time interlace for the P2P downlink and another time interlace for the P2P uplink) and may correspond to approximately 20% of the total available resources. The coarse granularity and the extended duration of the allocated resources for P2P communication may result in inefficient use of the allocated resources in some scenarios.

The inefficiencies in resource allocation for P2P communication described above may be mitigated by assuming that WAN communication and P2P communication do not need to be completely orthogonalized. It may be sufficient to (1) have P2P devices control their transmit power to a sufficiently low level and (2) avoid scheduling WAN devices on resources where these WAN devices may cause high interference to P2P devices. Objective (1) may be readily achievable since P2P devices may be located in close proximity to one another and may be able to achieve good performance even with a low transmit power level. Objective (2) may be achieved if a base station can be made aware of which WAN devices cause high interference to nearby P2P devices (e.g., due to close proximity and relatively high transmit power of the WAN devices). For example, P2P devices may detect the presence of nearby WAN devices and may report the detected WAN devices to their serving base stations. WAN devices may also detect the presence of nearby P2P devices and may report the detected P2P devices to their serving base stations. The base stations may then avoid scheduling these WAN devices on resources used by the nearby P2P devices.

In one design of network-assisted resource negotiation between WAN and P2P, a network entity (e.g., a base station) may appear as a "virtual" P2P group in order to achieve objectives (1) and (2) described above. The network entity may behave as a P2P group owner in negotiation for resources with other P2P group owners, which may think that they are negotiating with another P2P group owner instead of the network entity. The resource negotiation procedure for the network-transparent architecture described above may be reused for the network-assisted architecture.

In a co-channel P2P deployment, base stations may be adversely impacted by interference from P2P devices. The P2P devices may control their transmit power to ensure that the interference caused by these P2P devices at the base stations is below a certain tolerable level. This may be achieved by limiting the maximum transmit power of P2P devices such that a target load level can be met at the base stations. Standard power control techniques may be used for this purpose, possibly by leveraging the WAN connectivity maintained by the P2P devices to the base stations. In most P2P scenarios, the P2P devices should be relatively close to each other, and relatively low transmit power may be sufficient to provide good performance for P2P communication. Hence, the constraint on the transmit power of the P2P devices may not result in significant performance degradation.

Simultaneously using the same resources by WAN devices and P2P devices may lead to interference at the P2P devices, e.g., at the P2P group owners if resources for the uplink are used for P2P communication. It may be challenging to avoid this interference through power control since the WAN devices may be located relatively close to the P2P devices but far from their serving base stations and may thus need to transmit at high power in order to overcome a large pathloss to their serving base stations. Interference from the WAN devices to the P2P devices may be mitigated by proper scheduling. A scheduler for a base station may be informed of which P2P devices are impacted by a specific WAN device as well as which resources are used by the P2P devices. The scheduler may then avoid scheduling this WAN device on the resources used by the P2P devices. The scheduler may schedule other WAN devices on the same resources used by the P2P devices if these other WAN devices do not cause high interference to the P2P devices. This may enable shared usage of resources by appropriate WAN devices and P2P devices.

For network-assisted resource negotiation between P2P groups, a network entity (e.g., a base station) may participate in the resource negotiation process between P2P groups but may keep its involvement transparent to the P2P groups. The P2P groups may be unaware of the involvement by the network entity. This design may support different levels of network involvement for resource negotiation. In particular, a "lazy" network implementation may not become involved in resource negotiation between P2P groups whereas a "smart" network implementation may become involved. This design may also support heterogeneous networks. For example, macro base stations may become involved in resource negotiation between P2P groups whereas pico and home base stations may not support the complexity of coordinating P2P communication.

For network-transparent resource negotiation, base stations may serve as proxies that simply relay negotiation messages exchanged between P2P groups. For network-assisted resource negotiation, base stations may become involved in resource negotiation by accessing, delaying, and/or altering negotiation messages exchanged between P2P group owners. In one design, a base station may receive negotiation messages, determine a beneficial assignment of resources to different P2P groups, alter the negotiation messages to reflect the beneficial resource assignment, and forward altered messages to P2P group owners.

The base stations may intercept and alter the negotiation messages (e.g., request messages and response messages) such that these messages appear as though they originated from P2P group owners. Hence, involvement of the base stations in the resource negotiation process may be mostly or completely hidden from the P2P group owners. This may result in significant performance gain because the base stations may see all negotiation messages exchanged between the P2P group owners and may have a more complete picture of the interference conditions observed by the P2P devices. There may be some delay associated with involvement by the base stations in resource negotiation between the P2P group owners. However, the delay may not adversely impact performance since this involvement may actually lead to a faster convergence of the resource negotiation process.

The negotiation messages exchanged between P2P group owners for resource negotiation may be defined to include pertinent fields and/or values to facilitate involvement of base stations in the resource negotiation process. In one design, the priority field of a negotiation message may be set to a special value (e.g., "extremely high priority"), which may be set only by base stations and may not be over-ridden by P2P group owners. In one design, a base station may determine a beneficial assignment of resources to different P2P groups. The base station may modify the requested resources field of negotiation messages exchanged between the P2P group owners based on the beneficial resource assignment and may also set the priority field of these messages to the "extremely high priority" value to enforce the resource assignment at the P2P group owners. The negotiation messages altered by the base station may be similar to negotiation messages sent by P2P group owners, e.g., possibly except for the "extreme high priority" value.

The priority field may enable the negotiation messages to support both a decentralized architecture and a master/slave architecture. In the decentralized architecture, a recipient of a resource request may make a determination of whether to grant or reject the resource request. In the master/slave architecture, a recipient (e.g., a P2P group owner) may abide by a resource request from a base station.

In one design, negotiation messages may include utility metrics determined by P2P group owners. The messages may have a request field so that the utility metrics may be reported only if this information is utilized by recipients of the messages. Base stations may intercept and use the utility metrics of P2P group owners to improve association decisions for P2P communication or WAN communication. Without this information, the base stations may not have an accurate estimation of the achievable throughput for a P2P group and any decision to change from P2P communication to WAN communication, or vice-versa, may be made heuristically.

Figure 7:
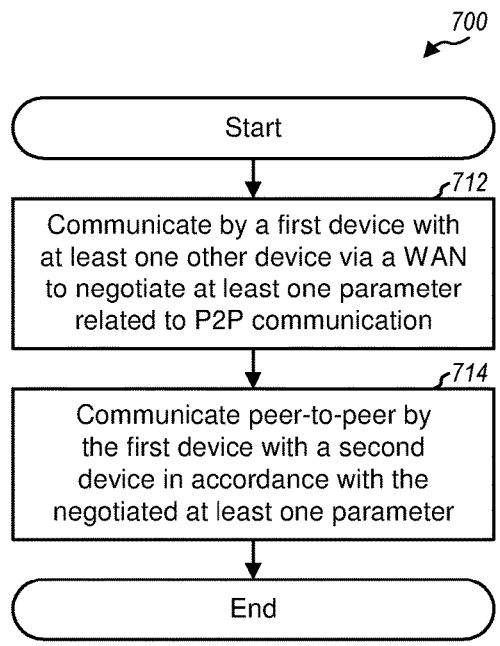
FIG. 7 shows a process for performing resource negotiation.

FIG. 7 shows a design of a process 700 for performing resource negotiation. Process 700 may be performed by a first device (as described below) or by some other entity. The first device may communicate with at least one other device via a WAN to negotiate at least one parameter related to P2P communication (block 712). The first device may communicate peer-to-peer with a second device in accordance with the negotiated at least one parameter (block 714).

In one design, the first device may detect the at least one other device via peer discovery and may obtain at least one device ID of the at least one other device. In another design, the first device may receive information (e.g., at least one device ID) identifying the at least one other device from the second device, which may detect the at least one other device via peer discovery. For both designs, the first device may determine at least one network address of the at least one other device based on the at least one device ID. The first device may establish a WAN connection and may communicate with the at least one other device via the WAN based on the at least one network address.

In one design, the at least one parameter may comprise a parameter related to resources assigned to the first device. The first device may communicate peer-to-peer with the second device using the resources assigned to the first device. In another design, the at least one parameter may comprise a parameter related to selection of a P2P group for a particular device (e.g., the second device). In yet another design, the at least one parameter may include a parameter related to association, which may select P2P communication instead of WAN communication for the first and second devices.

In one design of block 712, the first device may send a resource request to the at least one other device and may receive at least one response for the resource request from the at least one other device. The resource request may comprise a utility metric indicative of performance of the first device for resources requested by the first device. The resource request may also comprise other information useful for resource negotiation, such as a priority of the resource request, the amount of resources being requested, the specific resources being requested, etc. The first device may monitor usage of a set of resources by other devices and may select the specific resources to request based on the monitored usage of the set of resources. In another design of block 712, the first device may receive at least one resource request from the at least one other device, determine whether to grant or reject each of the at least one request, and send at least one response to the at least one other device.

In one design, the first device may be associated with a first P2P group, and the at least one other device may be associated with at least one other P2P group. Each P2P group may include at least two devices interested or engaged in P2P communication. Each P2P group may include a P2P group owner and at least one P2P client. The first device and the at least one other device may be P2P group owners of the first P2P group and the at least one other P2P group, respectively.

In one design, the first device may send feedback information to a network entity for use to allocate resources for P2P communication. The feedback information may comprise resource usage information, or channel state information, or some other information, or a combination thereof. The first device may periodically send feedback information or when triggered.

Figure 8:
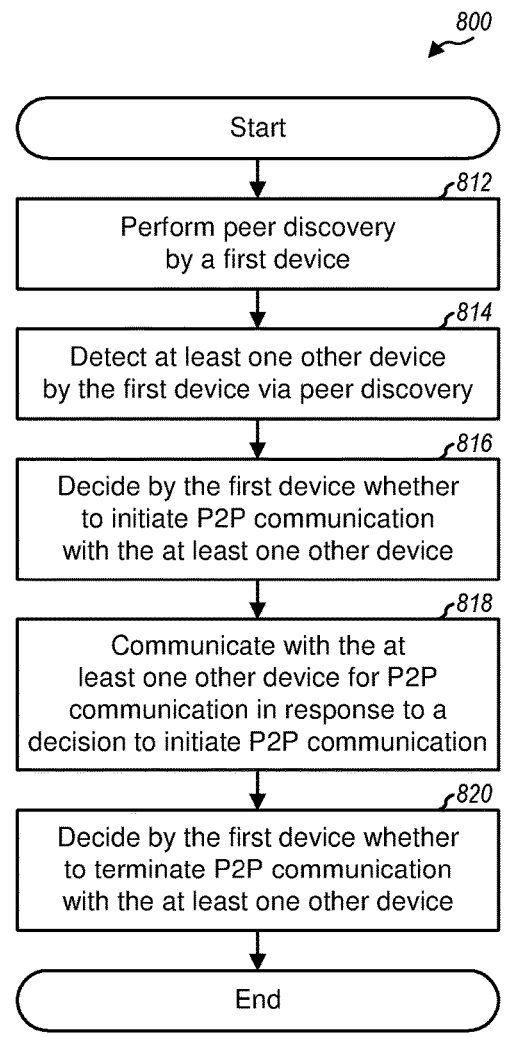
FIG. 8 shows a process for performing association.

FIG. 8 shows a design of a process 800 for performing association. Process 800 may be performed by a first device (as described below) or by some other entity. The first device may perform peer discovery (block 812) and may detect at least one other device via peer discovery (block 814). The first device may autonomously decide whether to initiate P2P communication with the at least one other device (block 816). For example, the first device may decide whether to initiate P2P communication based on pathloss for the at least one other device, or interference from other devices engaged in P2P communication, or resources available for P2P communication, or some other factor, or a combination thereof. The first device may communicate with the at least one other device for P2P communication in response to a decision to initiate P2P communication (block 818). The first device may autonomously decide whether to terminate P2P communication with the at least one other device (block 820).

Figure 9:
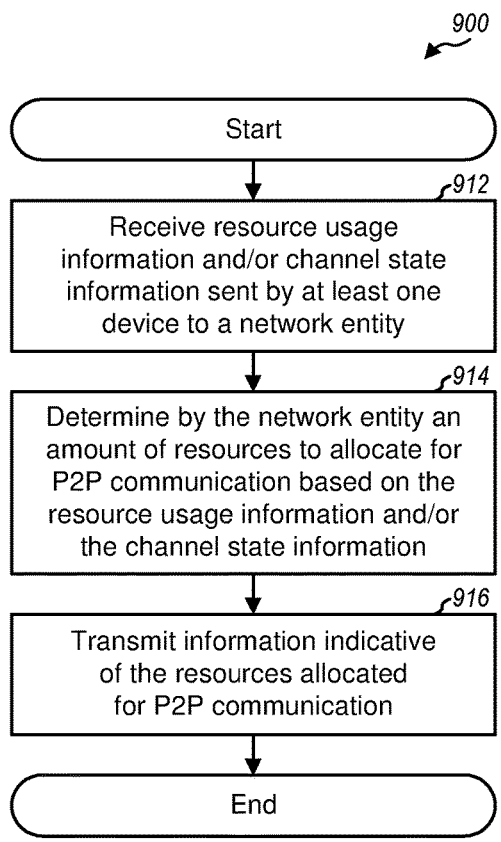
FIG. 9 shows a process for performing resource partitioning.

FIG. 9 shows a design of a process 900 for performing resource partitioning to allocate resources for P2P communication. Process 900 may be performed by a network entity, which may be a base station, a network controller, or some other entity. The network entity may receive resource usage information and/or channel state information sent by at least one device to the network entity (block 912). The resource usage information may be indicative of usage of resources by devices for P2P communication and may convey the number of devices engaged in P2P communication, or the amount of data to send for P2P communication, or some other information, or a combination thereof. The channel state information may be indicative of channel conditions observed by the at least one device and may comprise pathloss information, or interference detected on different resources, or some other information, or a combination thereof. The network entity may determine an amount of resources to allocate for P2P communication based on the resource usage information and/or the channel state information (block 914). The network entity may transmit (e.g., broadcast) information indicative of the resources allocated for P2P communication (block 916). In one design, the network entity may periodically receive resource usage information and/or channel state information from devices and may periodically determine the amount of resources to allocate for P2P communication.

In one design, the network entity may identify first resources used for both WAN communication and P2P communication. In one design, at least one P2P device may transmit at a low power level below a predetermined level on the first resources to reduce interference to one or more WAN devices engaged in WAN communication on the first resources. In another design, the network entity may determine at least one WAN device potentially causing high interference to the at least one P2P device on the first resources. The network entity may schedule the at least one WAN device on second resources different from the first resources to avoid causing high interference to the at least one P2P device.

Figure 10:
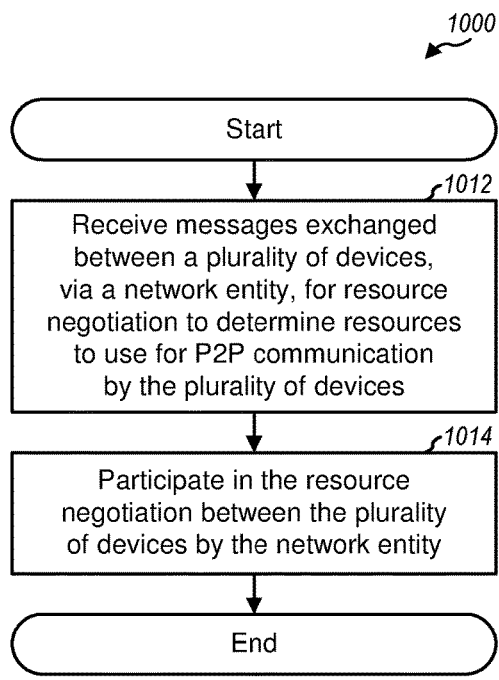
FIG. 10 shows a process for participating in resource negotiation.

FIG. 10 shows a design of a process 1000 for participating in resource negotiation. Process 1000 may be performed by a network entity, which may be a base station, a network controller, or some other entity. The network entity may receive messages exchanged between a plurality of devices, via the network entity, for resource negotiation to determine resources to use for P2P communication by the plurality of devices (block 1012). The network entity may participate in the resource negotiation between the plurality of devices (block 1014).

In one design of block 1014, the network entity may modify at least one message received from at least one originating device among the plurality of devices. The network entity may forward the modified message(s) to at least one recipient device among the plurality of devices.

In one design, the network entity may obtain utility metrics from the received messages. The network entity may determine an assignment of resources to the plurality of devices for P2P communication based on the utility metrics. The network entity may modify the received messages based on the assignment of resources. In one design, the network entity may set a priority field of a modified message to a highest priority level to enforce acceptance of the modified message by at least one recipient device.

In one design, some resources may be allocated for P2P communication via resource partitioning. The plurality of devices may negotiate for the allocated resources for P2P communication. In one design, the network entity may participate in the resource negotiation in block 1014 to reclaim some of the allocated resources for WAN communication. The network entity may use the reclaimed resources for WAN communication by at least one device served by the network entity. In another design, the network entity may participate in the resource negotiation for association. The network entity may obtain information (e.g., utility metrics) indicative of the performance of P2P communication from the received messages. The network entity may select P2P communication or WAN communication for at least one device based on the obtained information.

In one design, each of the plurality of devices may belong in a different one of a plurality of P2P groups. Each P2P group may include at least two devices interested or engaged in P2P communication. The network entity may appear as a P2P group owner of a P2P group to the plurality of devices in the resource negotiation. The plurality of devices may be unaware of participation of the network entity in the resource negotiation.

Figure 11B:
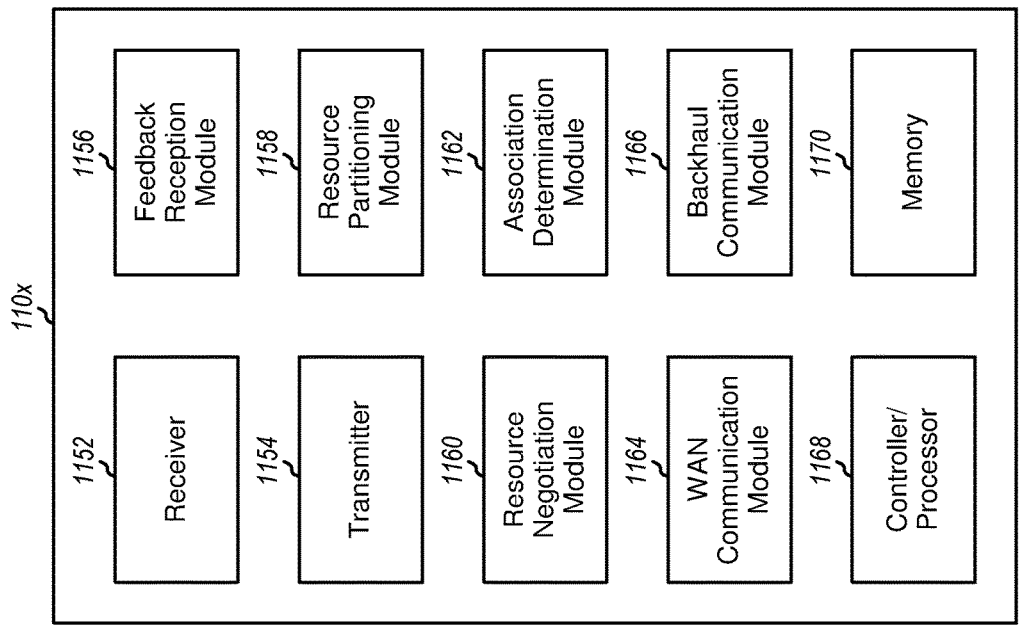
FIG. 11B shows a block diagram of a base station.
Figure 11A:
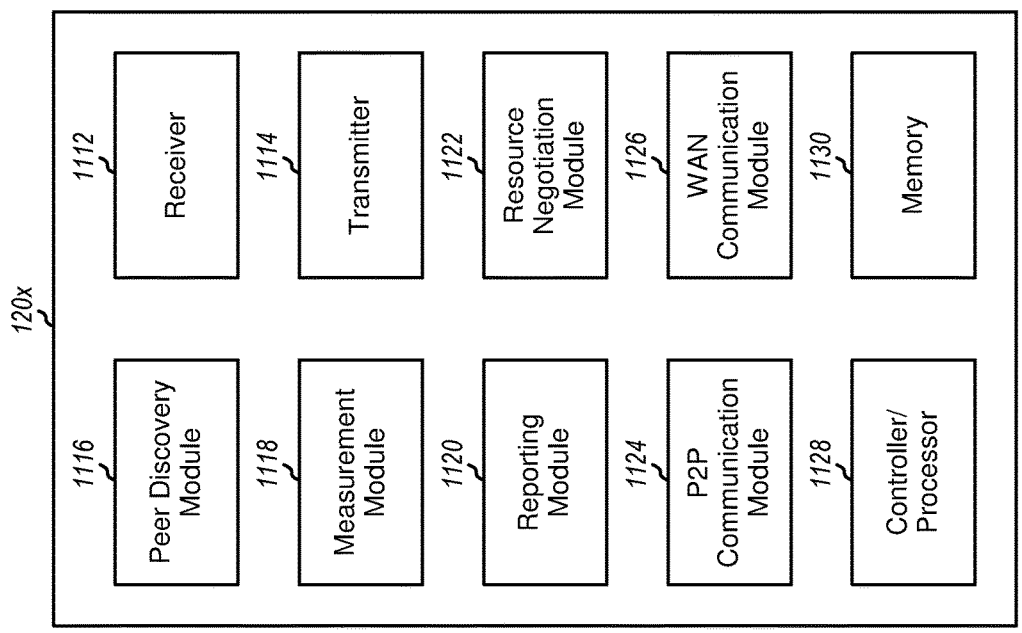
FIG. 11A shows a block diagram of a device.

FIG. 11A shows a block diagram of a design of a device 120x capable of P2P communication and WAN communication. Within device 120x, a receiver 1112 may receive P2P signals transmitted by other devices for P2P communication and downlink signals transmitted by base stations for WAN communication. A transmitter 1114 may transmit P2P signals to other devices for P2P communication and uplink signals to base stations for WAN communication. A module 1116 may perform peer discovery, detect the presence of other devices, and obtain a device ID of each detected device. A module 1118 may make measurements for received power of detected devices and base stations and may determine pathloss based on the received power measurements. Module 1118 may also measure interference on different resources that may be used for P2P communication. A module 1120 may report the measurements, device IDs, and/or other information to a serving base station. A module 1122 may perform resource negotiation with other P2P devices to obtain resources to use for P2P communication, e.g., as described above. A module 1124 may support P2P communication, e.g., generate and process signals used for P2P communication. A module 1126 may support WAN communication, e.g., generate and process signals used for WAN communication. The various modules within device 120x may operate as described above. A controller/processor 1128 may direct the operation of various modules within device 120x. A memory 1130 may store data and program codes for device 120x.

FIG. 11B shows a block diagram of a design of a base station 110x supporting P2P communication and WAN communication. Within base station 110x, a receiver 1152 may receive uplink signals transmitted by devices for WAN communication. A transmitter 1154 may transmit downlink signals to devices for WAN communication. A module 1156 may receive reports from devices, which may include measurements, device IDs, etc. A module 1158 may perform resource partitioning to allocate some of the available resources for P2P communication. A module 1160 may perform resource negotiation with P2P devices to assist assignment of the allocated resources to different P2P devices and/or to reclaim some of the allocated resources for WAN communication. Module 1160 may also facilitate sharing of resources for WAN communication and P2P communication, e.g., by identifying WAN devices potentially causing high interference to P2P devices and having these WAN devices scheduled on resources not used by the P2P devices. A module 1162 may perform association and select WAN communication or P2P communication for different devices. A module 1164 may support WAN communication for devices, e.g., generate and process signals used for WAN communication. A module 1166 may support communication with other network entities (e.g., other base stations) via the backhaul (e.g., for resource partitioning). The various modules within base station 110x may operate as described above. A controller/processor 1168 may direct the operation of various modules within base station 110x. A memory 1130 may store data and program codes for base station 110x.

The modules within device 120x in FIG. 11A and the modules within base station 110x in FIG. 11B may comprise processors, electronic devices, hardware devices, electronic components, logical circuits, memories, software codes, firmware codes, etc., or any combination thereof.

Figure 12:
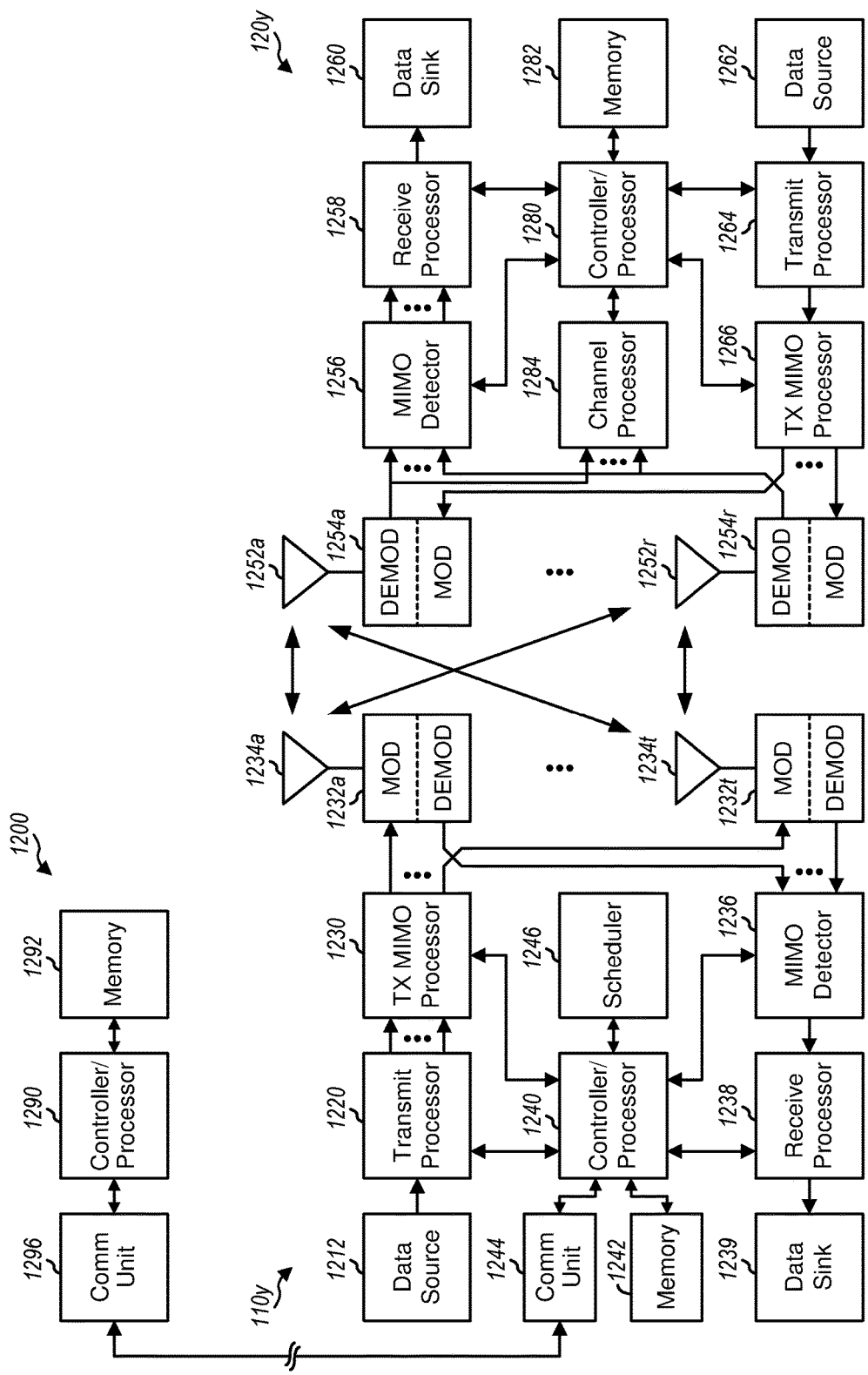
FIG. 12 shows another block diagram of a base station and a device.

FIG. 12 shows a block diagram of a design of a base station 110y and a device 120y, which may be one of the base stations and one of the devices in FIG. 1. Base station 110y may be equipped with T antennas 1234a through 1234t, and device 120y may be equipped with R antennas 1252a through 1252r, where in general T≥1 and R≥1.

At base station 110y, a transmit processor 1220 may receive data for one or more devices from a data source 1212 and control information (e.g., messages supporting resource negotiation, P2P communication, WAN communication, etc.) from a controller/processor 1240. Processor 1220 may process (e.g., encode and modulate) the data and control information to obtain data symbols and control symbols, respectively. Processor 1220 may also generate reference symbols for synchronization signals, reference signals, etc. A transmit (TX) multiple-input multiple-output (MIMO) processor 1230 may perform spatial processing (e.g., precoding) on the data symbols, the control symbols, and/or the reference symbols, if applicable, and may provide T output symbol streams to T modulators (MODs) 1232a through 1232t. Each modulator 1232 may process a respective output symbol stream (e.g., for OFDM, etc.) to obtain an output sample stream. Each modulator 1232 may further process (e.g., convert to analog, amplify, filter, and upconvert) the output sample stream to obtain a downlink signal. T downlink signals from modulators 1232a through 1232t may be transmitted via T antennas 1234a through 1234t, respectively.

At device 120y, antennas 1252a through 1252r may receive the downlink signals from base station 110y, downlink signals from other base stations, and/or P2P signals from other devices and may provide received signals to demodulators (DEMODs) 1254a through 1254r, respectively. Each demodulator 1254 may condition (e.g., filter, amplify, downconvert, and digitize) a respective received signal to obtain input samples. Each demodulator 1254 may further process the input samples (e.g., for OFDM, etc.) to obtain received symbols. A MIMO detector 1256 may obtain received symbols from all R demodulators 1254a through 1254r, perform MIMO detection on the received symbols if applicable, and provide detected symbols. A receive processor 1258 may process (e.g., demodulate and decode) the detected symbols, provide decoded data for device 120y to a data sink 1260, and provide decoded control information to a controller/processor 1280. A channel processor 1284 may detect proximity detection signals from P2P devices and downlink signals from base stations. Processor 1284 may measure the received signal strength of the detected proximity detection signals and downlink signals and may determine pathloss of each detected P2P device and base station.

On the uplink, at device 120y, a transmit processor 1264 may receive data from a data source 1262 and control information (e.g., messages for resource negotiation, P2P communication, WAN communication, etc.) from controller/processor 1280. Processor 1264 may process (e.g., encode and modulate) the data and control information to obtain data symbols and control symbols, respectively. Processor 1264 may also generate symbols for a reference signal, a proximity detection signal, etc. The symbols from transmit processor 1264 may be precoded by a TX MIMO processor 1266 if applicable, further processed by modulators 1254a through 1254r (e.g., for SC-FDM, OFDM, etc.), and transmitted to base station 110y, other base stations, and/or other devices. At base station 110y, the uplink signals from device 120y and other devices may be received by antennas 1234, processed by demodulators 1232, detected by a MIMO detector 1236 if applicable, and further processed by a receive processor 1238 to obtain decoded data and control information sent by device 120y and other devices. Processor 1238 may provide the decoded data to a data sink 1239 and the decoded control information to controller/processor 1240.

Controllers/processors 1240 and 1280 may direct the operation at base station 110y and device 120y, respectively. Processor 1280 and/or other processors and modules at device 120y may perform or direct process 400 in FIG. 4, process 500 in FIG. 5, process 600 in FIG. 6, process 700 in FIG. 7, process 800 in FIG. 8, and/or other processes for the techniques described herein. Processor 1240 and/or other processors and modules at base station 110y may perform or direct process 900 in FIG. 9, process 1000 in FIG. 10, and/or other processes for the techniques described herein. Memories 1242 and 1282 may store data and program codes for base station 110y and device 120y, respectively. A communication (Comm) unit 1244 may enable base station 110y to communicate with other network entities. A scheduler 1246 may schedule devices for WAN communication.

FIG. 12 also shows a design of a network entity 1200, which may be network controller 130 or directory server 140 in FIG. 1 or some other entity. Within network entity 1200, a controller/processor 1290 may perform various functions to support P2P communication and/or WAN communication. For example, processor 1290 may perform or direct process 900 in FIG. 9, process 1000 in FIG. 10, and/or other processes for the techniques described herein. A memory 1292 may store program codes and data for network entity 1200. A communication unit 1296 may enable network entity 1200 to communicate with other network entities.

In one configuration, apparatus 120x or 120y for a first device may include means for communicating with at least one other device via a WAN to negotiate at least one parameter related to P2P communication, and means for communicating peer-to-peer with a second device in accordance with the negotiated at least one parameter.

In another configuration, apparatus 120x or 120y for a first device may include means for performing peer discovery, means for detecting at least one other device via peer discovery, means for deciding whether to initiate P2P communication with the at least one other device, means for communicating with the at least one other device for P2P communication in response to a decision to initiate P2P communication, and means for deciding whether to terminate P2P communication with the at least one other device.

In yet another configuration, apparatus 110x, 110y, or 1200 for a network entity may include means for receiving resource usage information and/or channel state information sent by at least one device to the network entity, means for determining an amount of resources to allocate for P2P communication based on the resource usage information and/or the channel state information, and means for transmitting (e.g., broadcasting) information indicative of the resources allocated for P2P communication.

In yet another configuration, apparatus 110x, 110y, or 1200 for a network entity may include means for receiving messages exchanged between a plurality of devices for resource negotiation to determine resources to use for P2P communication by the plurality of devices, and means for participating in the resource negotiation between the plurality of devices, e.g., by modifying messages exchanged between the plurality of devices.

In an aspect, the aforementioned means may be processor(s) 1220, 1238 and/or 1240 at base station 110y and/or processors(s) 1258, 1264 and/or 1280 at device 120y, which may be configured to perform the functions recited by the aforementioned means. In another aspect, the aforementioned means may be one or more modules or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   performing peer discovery by a first user equipment (UE) by transmitting a proximity detection signal to indicate a presence of the first UE and listening for proximity detection signals from other UEs;
   detecting at least one other UE by the first UE via the peer discovery and in response to the listening for proximity detection signals from other UEs;
   deciding by the first UE whether to initiate peer-to-peer (P2P) communication with the at least one other UE;
   communicating with the at least one other UE for P2P communication in response to a decision to initiate P2P communication; and
   autonomously deciding by the first UE whether to terminate P2P communication with the at least one other UE.

2. The method of claim 1, wherein the deciding whether to initiate P2P communication comprises deciding whether to initiate P2P communication based on pathloss for the at least one other UE, or interference from other UEs engaged in P2P communication, or resources available for P2P communication, or a combination thereof.

3. An apparatus for wireless communication, comprising:
   means for performing peer discovery by a first user equipment (UE) by transmitting a proximity detection signal to indicate a presence of the first UE and listening for proximity detection signals from other UEs;
   means for detecting at least one other UE by the first UE via the peer discovery and in response to the listening for proximity detection signals from other UEs;
   means for deciding by the first UE whether to initiate peer-to-peer (P2P) communication with the at least one other UE;
   means for communicating with the at least one other UE for P2P communication in response to a decision to initiate P2P communication; and
   means for autonomously deciding by the first UE whether to terminate P2P communication with the at least one other UE.

4. An apparatus for wireless communication, comprising:
   at least one processor configured to:
   perform peer discovery by a first user equipment (UE) by transmitting a proximity detection signal to indicate a presence of the first UE and listening for proximity detection signals from other UEs,
   detect at least one other UE by the first UE via the peer discovery and in response to the listening for proximity detection signals from other UEs,
   decide by the first UE whether to initiate peer-to-peer (P2P) communication with the at least one other UE,
   communicate with the at least one other UE for P2P communication in response to a decision to initiate P2P communication, and
   autonomously decide by the first UE whether to terminate P2P communication with the at least one other UE.

5. A computer program product, comprising:
a non-transitory computer-readable medium comprising:
   code for causing at least one processor to perform peer discovery by a first user equipment (UE) by transmitting a proximity detection signal to indicate a presence of the first UE and listening for proximity detection signals from other UEs,
   code for causing the at least one processor to detect at least one other UE by the first UE via the peer discovery and in response to the listening for proximity detection signals from other UEs,
   code for causing the at least one processor to decide by the first UE whether to initiate peer-to-peer (P2P) communication with the at least one other UE,
   code for causing the at least one processor to communicate with the at least one other UE for P2P communication in response to a decision to initiate P2P communication, and
   code for causing the at least one processor to autonomously decide by the first UE whether to terminate P2P communication with the at least one other UE.

6. The method of claim 1, wherein the performing of the peer discovery by the first UE includes transmitting the proximity detection signal to indicate the presence of the first UE to another a second UE.

7. The method of claim 1, wherein the performing of the peer discovery by the first UE includes listening for a proximity detection signal from another UE.

8. The method of claim 1, wherein the detecting of the at least one other UE by the first UE includes obtaining a device identifier of the at least one other UE based on a proximity detection signal.

9. The apparatus of claim 3, wherein the means for the performing of the peer discovery by the first UE includes means for transmitting the proximity detection signal to indicate the presence of the first UE to another a second UE.

10. The apparatus of claim 3, wherein the means for the performing of the peer discovery by the first UE includes means for listening for a proximity detection signal from another UE.

11. The apparatus of claim 3, wherein the means for the detecting of the at least one other UE by the first UE includes means for obtaining a device identifier of the at least one other UE based on a proximity detection signal.

12. The apparatus of claim 4, wherein the at least one processor is configured to transmit the proximity detection signal to indicate the presence of the first UE to another a second UE to perform the peer discovery by the first UE.

13. The apparatus of claim 4, wherein the at least one processor is configured to listen for a proximity detection signal from another UE to perform the peer discovery by the first UE.

14. The apparatus of claim 4, wherein the at least one processor is configured to obtain a device identifier of the at least one other UE based on a proximity detection signal to detect the at least one other UE by the first UE.

15. The computer program product of claim 5, wherein to perform the peer discovery by the first UE, the non-transitory computer-readable medium further comprises code for causing the at least one processor to transit the proximity detection signal to indicate the presence of the first UE to another a second UE.

16. The computer program product of claim 5, wherein to perform the peer discovery by the first UE, the non-transitory computer-readable medium further comprises code for causing the at least one processor to listen for a proximity detection signal from another UE.

17. The computer program product of claim 5, wherein to detect the at least one other UE by the first UE, the non-transitory computer-readable medium further comprises code for causing the at least one processor to obtain a device identifier of the at least one other UE based on a proximity detection signal.

* * * * *